United States Patent [19]
Tang

[11] Patent Number: 5,599,890
[45] Date of Patent: Feb. 4, 1997

[54] POLYMERIC BINDER

[75] Inventor: Xun Tang, Dresher, Pa.

[73] Assignee: Rohm and Haas Company, Philadelphia, Pa.

[21] Appl. No.: 210,844

[22] Filed: Mar. 21, 1994

[51] Int. Cl.$^6$ .................. C08F 224/00; C08F 226/06; C08F 214/00; C08F 220/10; C08F 218/04; C08F 220/44

[52] U.S. Cl. .................. 526/260; 526/291; 526/328.5; 526/330; 526/342; 526/347; 264/60

[58] Field of Search .................. 526/260, 291, 526/328.5, 330, 342, 347

[56] References Cited

U.S. PATENT DOCUMENTS

| | | | |
|---|---|---|---|
| 4,199,400 | 4/1980 | Bakule et al. | 162/146 |
| 4,336,345 | 6/1982 | Lewis et al. | 525/107 |
| 5,019,537 | 5/1991 | Kato et al. | |
| 5,278,251 | 1/1994 | Ohtani et al. | 525/309 |

FOREIGN PATENT DOCUMENTS

| | | |
|---|---|---|
| 362866 | 10/1989 | European Pat. Off. . |
| 409459 | 1/1991 | European Pat. Off. . |
| 511429 | 5/1991 | European Pat. Off. . |
| 59-128266 | 7/1984 | Japan . |

OTHER PUBLICATIONS

"Investigations into the Burning–Out of Organic Substances in the Ceramic Body", C. Locher, E. Pfaff, P. Schulz and C. Zografou, NASA Technical Memorandum #TM-77065, Jun. 1983.

"Pyrolysis Behavior of Acrylic Polymers and Acrylic Polymer/Ceramic Mixtures", Y. –N Sun, M. D. Sacks, and J. W. Williams, Ceramic Transactions, ED., L. G. Messing, E. R. Fuller and H. Hausner, vol. 1, pp. 538–548, Pub. American Ceramics Society, 1988.

*Primary Examiner*—Joseph L. Schofer
*Assistant Examiner*—Wu C. Cheng
*Attorney, Agent, or Firm*—Joseph F. Leightner

[57] ABSTRACT

A polymeric binder for ceramic materials is provided. The polymeric binder has a temperature range for pyrolysis which is broader than that for polymeric binders conventionally used in ceramic materials. The broader pyrolysis range provides for gradual removal of the binder when a ceramic part containing the binder is heated. Gradual removal of the binder minimizes the formation of voids and cracking in the ceramic part. Voids or cracking can lead to defects in the part, and destruction of the part may occur during removal if a polymeric binder used in the part is rapidly decomposed into gases. Therefore the polymeric binder of the present invention provides for ceramic parts with fewer defects and less chance of destruction than occurs with polymeric binders conventionally used in ceramic parts.

7 Claims, No Drawings

POLYMERIC BINDER

This invention relates to a polymeric binder for ceramic materials, which decomposes gradually when a ceramic material containing the binder is heated. The binder is formed from the homopolymerization or copolymerization of 2-(3-oxazolidinyl)ethyl methacrylate. The binder may also be a blend of the (2-(3-oxazolidinyl)ethyl methacrylate) homopolymer or copolymer with one or more other polymers. The gradual decomposition of the binder during heating allows for removal of gaseous products without cracking or explosion of ceramic parts.

A ceramic material may be processed into a solid object from a slurry, known as a ceramic slip. The ceramic slip is a liquid dispersion of ceramic powder and any additives required for processing, including binders. The slip may be cast in a mold for the formation of large parts such as for example turbine blades or toilet bowls. The slip may also be formed into a sheet in a process known as tape casting, or may be dried to a powder by a process such as spray drying. The powder may then be "dry pressed" to form ceramic parts.

Binders are used in ceramic materials to add strength and flexibility during processing steps such as dry pressing, molding and casting. Strength is required during machining of ceramic parts and is also important if the parts are to be stacked on one another. Flexibility is important during casting, particularly tape casting, where the sheet or film being formed is rolled as it is formed.

Following casting or dry pressing to form a ceramic part the ceramic part is heated to form a dense part; this is called firing. Binders and other additives are removed during the firing of ceramic parts. Removal of a binder during firing of a ceramic part is referred to as "burnout". A ceramic part before firing is known as a "green part". A ceramic part is also referred to as a ceramic "body".

Firing of a ceramic part is generally done in two stages. In the first stage, the green part is heated gradually to a temperature below 1000° C. The heating rate may be within the range from 0.1 degree centigrade per minute to 50 degrees centigrade per minute, and depends upon the size and the shape of the green part. The purpose of the first stage is the removal of all organic additives such as for example by evaporation or decomposition. Decomposition during heating is also referred to as "pyrolysis". It is during this stage that the binder is substantially removed from the ceramic green part.

Binders for ceramic materials may be polymeric or they may be non-polymeric materials such as for example clay. Polymeric binders offer greater strength in ceramic parts than do non-polymeric materials. Polymeric materials useful as binders for ceramic materials include polyvinyl alcohol, polyvinyl butyral and poly(ethylene glycol). Problems associated with these polymeric binders include water sensitivity and rapid decomposition during firing. Acrylic polymers, such as for example methyl methacrylate, do not have the problem of water sensitivity but are also rapidly decomposed during firing. Rapid gas release during decomposition leads to voids and cracking which in turn produce defects in the formed ceramic parts. Destruction of the formed parts can also occur if the gas release is explosive.

Polymeric binders that have conventionally been used in ceramic parts have relatively narrow pyrolysis ranges, such as for example as narrow as 50 degrees centigrade. For example, the polymeric binder poly(methyl methacrylate) has a temperature range for pyrolysis from about 300° C. to about 350° C. (Y. N. Sun et al, "Ceramic Transactions 1A, 538 (1988)). The narrower the pyrolysis range, the more rapidly the polymeric binder is likely to decompose, causing the formation of voids and cracking of ceramic parts containing the binder.

In the second stage of firing, called "sintering", the part is heated to a temperature above 1000° C.

The present invention seeks to overcome the problems associated with the rapid decomposition that occurs with the burnout of acrylic binders in ceramic materials.

In a first aspect of this invention, there is provided a ceramic binder of a polymer formed from at least 5 percent by weight 2-(3-oxazolidinyl)ethyl methacrylate.

Another aspect of this invention provides a method for reducing the formation of voids in a ceramic material by incorporating into the ceramic material at least 5 percent by weight of a polymer comprising 2-(3-oxazolidinyl)ethyl methacrylate.

The present invention provides an acrylic polymeric binder that decomposes gradually during burnout. This gradual gas release therefore minimizes the formation of voids or cracking, and prevents the explosion of green ceramic parts which can occur with rapid gas release.

The polymeric binder of this invention is formed from the polymerization of 2-(3-oxazolidinyl)ethyl methacrylate, also known as OXEMA. Poly(2-(3-oxazolidinyl)ethyl methacrylate has a temperature range for pyrolysis from about 170° C. to about 600° C.

The polymeric binder of this invention may be a homopolymer or a copolymer of 2-(3-oxazolidinyl)ethyl methacrylate with one or more other monomers. Copolymers may be formed from the polymerization of 2-(3-oxazolidinyl)ethyl methacrylate with one or more other vinyl monomers, and preferably with acrylic comonomers such as for example n-butyl acrylate or methyl methacrylate. The use of a copolymer of 2-(3-oxazolidinyl)ethyl methacrylate with one or more other vinyl monomers may be desirable for particular applications in which it is not required or desired to have a pyrolysis range as broad as that for the (2-(3-oxazolidinyl)ethyl methacrylate) homopolymer. The amount of (2-(3-oxazolidinyl)ethyl methacrylate) to be used in the formation of a copolymer may range from 5 percent by weight to 95 percent by weight, preferably from 30 percent by weight to 60 percent by weight, based on the total weight of solid polymeric material.

Other monomers useful for forming the copolymeric binder of this invention include alkyl esters of acrylic and methacrylic acids, such as for example methyl, propyl, isopropyl, butyl, isobutyl, sec-butyl, amyl, isoamyl, tert-amyl, hexyl, cyclohexyl, 2-ethylhexyl, octyl, decyl, lauryl, myristyl, cetyl and stearyl esters. The binder may also be prepared from monoethylenically unsaturated polymerizable monomers such as for example vinylidene halides, vinyl halides, acrylonitrile, methacrylonitrile, vinyl esters such as for example vinyl formate, vinyl acetate and vinyl propionate; styrene; and hydroxy functional vinyl monomers.

Polymerization of 2-(3-oxazolidinyl)ethyl methacrylate may be accomplished by conventional polymerization techniques, such as for example solution polymerization as described in (U.S. Pat. No. 4,054,717).

The polymeric acrylic binder of this invention may also be formed by blending poly(2-(3-oxazolidinyl)ethyl methacrylate) homopolymer or copolymer with other polymers that do not have as broad a pyrolysis temperature range. A blend may be preferable in some applications because less selectivity may be required in choosing a compatible material for blending with poly(2-(3-oxazolidinyl)ethyl methacrylate) than in choosing a monomer which will copolymerize with (2-(3-oxazolidinyl)ethyl methacrylate). The blend may be formed by combining the polymers in solid form, or by combining solutions or emulsions of the polymers, depending upon the desired application for the ceramic material. For example, for an aqueous based blend binder, the aqueous solution homopolymer of 2-(3-oxazolidinyl)ethyl methacrylate may be blended with an aqueous emulsion polymer to form a blend that still remains in aqueous emulsion form.

A binder formed from a blend of poly(2-(3-oxazolidinyl)ethyl methacrylate) homopolymer or copolymer with one or more other polymers will have a temperature range for decomposition which is broader than the decomposition range for other acrylic polymers which have been conventionally used as binders for ceramic materials. The amount of poly(2-(3-oxazolidinyl)ethyl methacrylate) homopolymer or copolymer to be used in the formation of a binder from a blend of two or more polymers may range from 10 percent by weight to 90 percent by weight, preferably from 30 percent by weight to 60 percent by weight, based on the total weight of solid polymeric material.

Acrylic polymers useful for blending with poly2-(3-oxazolidinyl)ethyl methacrylate homopolymer or copolymer as provided by this invention include polymers of alkyl esters of acrylic and methacrylic acids, such as for example methyl, propyl, isopropyl, butyl, isobutyl, sec-butyl, amyl, isoamyl, tert-amyl, hexyl, cyclohexyl, 2-ethylhexyl, octyl, decyl, lauryl, myristyl, cetyl and stearyl esters. Other polymers for use in blending to form the binder according to this invention include polymers formed from the polymerization of other monoethylenically unsaturated monomers such as for example vinylidene halides, vinyl halides, acrylonitrile, methacrylonitrile, vinyl esters such as for example vinyl formate, vinyl acetate and vinyl propionate; styrene; and hydroxy functional vinyl monomers.

The polymeric binder provided by this invention may be in solution or emulsion form for incorporation into the ceramic slip. The ceramic slip with the polymeric binder may be tape cast or slip cast to form parts. Following the addition of the solution or the emulsion of the polymeric binder to the ceramic slip, the ceramic slip may be dried, such as for example by spray drying, and may then be pressed to form parts. The polymeric binder may also be dried into a powder before addition to the ceramic slip. The powder form of the binder may then be mixed with a ceramic powder for applications such as for example powder injection molding of ceramic parts.

In one embodiment of the present invention, an aqueous ceramic slip is prepared from 10 percent by weight to 90 percent by weight ceramic powder, 1 percent to 20 percent by weight polymeric binder and 0.3 percent to 1.5 percent dispersant. It is known to those skilled in the art that a ceramic slip may contain, in addition to the ceramic powder and binder, materials such as dispersants.

The following examples are intended to illustrate the present invention, but should not be construed as limiting the scope of the invention.

EXAMPLES

1) Binder Preparation by Copolymerization of 2-(3-oxazolidinyl)ethyl Methacrylate Preparation of Monomer Emulsion Doubly deionized $H_2O$ was used in all synthesis steps. To 60 grams (g) of $H_2O$, 6.0 g of a solution of 70% by weight Triton® X-405 surfactant (Union Carbide Chem. & Plastics Co.) was added. After the surfactant was completely dissolved, 55.0 g of ethyl acrylate then 15.0 g of methyl methacrylate were slowly added into the solution with vigorous stirring to form an emulsion. 30.0 g of 2-(3-oxazolidinyl)ethyl methacrylate was then slowly added to the emulsion solution with stirring.

Preparation of Cofeed Solutions
1) Cofeed solution 1 consisted of 0.4 g of 70% t-butyl hydroperoxide aqueous solution dissolved in 15 g of $H_2O$.

2) Cofeed solution 2 consisted of 0.32 g of 99+% L-ascorbic acid dissolved in 15 g of $H_2O$.

Polymerization

To a 500 ml four neck round-bottomed flask equipped with a stirrer and reflux condenser, 40 g of $H_2O$ was added, followed by 2.5 g of a 70% solution (by weight) of Triton® X-405. Moderate agitation was achieved with an overhead agitator equipped with a single Teflon blade and nitrogen gas was passed through the reactor above the solution. The reactor was heated to 50° C. After 15 minutes 5.0 g of the monomer emulsion was added to the reactor. One minute later, a solution consisting of 1 g of a 0.15% $FeSO_4.7H_2O$ solution and 1 g of a 1% (by weight) disodium ethylene diamine tetraacetate solution was added dropwise. A solution consisting of 0.1 g of 70% t-butyl hydroperoxide aqueous solution and 1 g of $H_2O$ was then added dropwise to the reactor, immediately followed by another solution consisting of 0.08 g of 99+% L-ascorbic acid dissolved in 2 g of $H_2O$. Polymerization was initiated within 1–2 minutes with a noticeable increase of temperature (approximately 5°–15° C.). After peak temperature of 62° C. was reached, the monomer emulsion, cofeed solution 1 and cofeed solution 2 were added at rates of 2.0 g/min, 0.18 g/min and 0.18 g/min, respectively. After the additions were completed, the polymerization was held at approximately 50° C. for 30 minutes Then, a solution consisting of 0.05 g of 70% t-butyl hydroperoxide aqueous solution diluted with 1 g of $H_2O$ was added dropwise, immediately followed by a solution consisting of 0.03 g of 99+% L-ascorbic acid dissolved in 2 g of $H_2O$. After 15 minutes, the addition of t-butyl hydroperoxide solution and L-ascorbic acid solution prepared as described above was repeated, and 15 minutes later repeated again. The reactor was held at approximately 50° C. for another 15 minutes and then cooled to room temperature. The resulting polymer was filtered through a 100 mesh sieve.

2) Binder Preparation by Blending Homopolymer of 2-(3-oxazolidinyl)ethyl Methacrylate with Acrylic Polymers To 9.2 g of a conventional acrylic emulsion which was 46% solid content by weight, 34.4 g of an aqueous solution of 26.7% by weight poly(2-(3-oxazolidinyl)ethyl methacrylate) was added slowly with moderate stirring. The blend was continuously stirred for 30 minutes. The blend remained in emulsion form. The blend ratio of the two polymers was 1:1 by weight.

3) Burnout Profiles

The binder described in Example 2 was freeze dried to remove moisture. Dry binder was obtained. Burnout profiles for the dry binder, for poly(2-(3-oxazolidinyl)ethyl methacrylate) homopolymer, and for a comparative binder were determined by thermogravimetric analysis. A TGA 7 Thermogravimetric Analyzer (Perkin Elmer) was employed. The analysis was done by heating the sample in air at a heating rate of 10° C./min from room temperature to 700° C. Data were obtained from the TGA 7 in the form of graphs, or "burnout profiles". The burnout profiles display the weight of sample remaining at each temperature as the binder is being heated.

Data from the burnout profiles are presented in Table 1. In the first column are temperatures, at intervals of 20 degrees centigrade. In the second column is the weight remaining at each temperature, as a percentage of the original sample weight, for a comparative acrylic binder. In the third column is the weight remaining, as a percentage of the original sample weight, for the poly(2-(3-oxazolidinyl)ethyl methacrylate) homopolymer, and in the fourth column is the weight remaining, as a percentage of the original sample weight, for the 1:1 blend binder.

The data show that the 1:1 blend binder is beginning to decompose as the temperature reaches 100° C., and has decomposed by about 10 percent by the time the temperature reaches 200° C., while the comparative acrylic binder does not decompose by 10 percent until the temperature reaches 380° C. The comparative acrylic binder then further decomposes relatively rapidly and less than 1 percent of both binders remains by the time the temperature reaches 700° C. The burnout profile for the homopolymer is the broadest, with 10 percent decomposed by the time the temperature reaches 240° C. and 2.5 percent still remaining at 700° C.

4) Burnout Data for Spray Dried Alumina Formulated with Binders

1) Formulation of alumina dispersion

A dispersion of alumina was prepared from 300 g of alumina powder, 120 g of water and 6 g of a 44.2% aqueous solution of the ammonium salt of poly(acrylic acid) by combining the alumina, the polymer solution, and the water, and ball milling for 45–60 minutes.

2) Formulation with 1:1 blend binder

To 142 g of the alumina dispersion prepared above 13.78 g of a solution which was 33.7% by weight 1:1 blend binder, prepared according to step 2, above, was added. This mixture was ball milled for another 30 minutes to form a slip.

3) Formulation with commercial polyethylene glycol binder

To 142 g of the alumina dispersion 15.47 g of 30% by weight of polyethylene glycol binder (Carbowax®, available from Union Carbide Chem. & Plastics Co.) was added, followed by 0.46 g of polypropylene glycol. This mixture was ball milled for another 30 minutes to form a slip.

4) Formulation with commercial polyvinyl alcohol binder

To 142 g of the above prepared "alumina dispersion", 15.47 g of 30% by weight of polyvinyl alcohol binder (Airvol®, Air Products) was added, followed by 0.46 g of polypropylene glycol. This mixture was ball milled for another 30 minutes to form a slip.

The resulting slips described in 2, 3, and 4 above were then separately spray dried in a spray dryer (Büchi 190) with inlet and outlet temperatures of 120°–130° C. and 60°–65° C., respectively, in nitrogen gas. The burnout profiles of the spray dried powders were determined by the same method as described in Example 3.

The data are compared in Table 2. In column 1 are sample temperatures in intervals of 20 degrees centigrade. In column 2 are weights of sample remaining at each temperature, for alumina formulated with 4.4 weight percent of the 1:1 blend binder. In column 3 are weights of sample remaining at each temperature for alumina formulated with 4.4 weight percent of poly(vinyl alcohol) (PVOH), a conventional binder. In column 4 are weights of sample remaining at each temperature for alumina formulated with 4.4 weight percent of poly(ethylene glycol) (PEG), also a conventional binder. In all cases, weights are expressed as percentage of initial sample weight.

The data indicate that the sample weight of the alumina formulated with the 1:1 blend binder is decomposed by 1 percent by the time the temperature reaches 180° C., while the alumina formulated with PVOH does not decompose by 1 percent until the temperature has reached 240° C. and the alumina formulated with PEG does not decompose by 1 percent until the temperature is between 180° C. and 200° C. At 300° C. the alumina formulated with the 1:1 blend binder has decomposed by 2 percent, but the alumina formulated with the conventional binders has decomposed by 4 to 5 percent, indicating a more rapid burnout with the conventional binders.

TABLE 1

| | RESIDUAL WEIGHT (PERCENT) | | |
|---|---|---|---|
| T (°C.) | COMPARATIVE BINDER 1 | HOMOPOLYMER OF PRESENT INVENTION | 1:1 BLEND[1] |
| 40 | 100.20 | 100.10 | 100.05 |
| 60 | 100.10 | 100.01 | 99.76 |
| 80 | 99.94 | 99.76 | 99.17 |
| 100 | 99.84 | 99.44 | 98.57 |
| 120 | 99.74 | 99.12 | 97.95 |
| 140 | 99.67 | 98.76 | 97.02 |
| 160 | 99.57 | 98.18 | 95.16 |
| 180 | 99.41 | 97.17 | 92.79 |
| 200 | 99.34 | 95.61 | 90.60 |
| 220 | 99.18 | 93.29 | 88.41 |
| 240 | 98.88 | 89.89 | 86.12 |
| 260 | 98.32 | 85.73 | 83.53 |
| 280 | 97.46 | 81.89 | 80.78 |
| 300 | 96.70 | 77.41 | 77.75 |
| 320 | 95.81 | 71.15 | 74.53 |
| 340 | 94.75 | 64.77 | 71.36 |
| 360 | 92.21 | 58.89 | 66.95 |
| 380 | 84.95 | 54.99 | 59.74 |
| 400 | 60.69 | 48.41 | 40.64 |
| 420 | 29.06 | 34.09 | 19.02 |
| 440 | 16.71 | 26.69 | 15.00 |
| 460 | 14.82 | 23.83 | 13.56 |
| 480 | 13.24 | 21.57 | 11.57 |
| 500 | 11.65 | 18.69 | 8.96 |
| 520 | 9.44 | 15.75 | 5.95 |
| 540 | 6.93 | 12.27 | 3.20 |
| 560 | 3.60 | 9.16 | 1.26 |
| 580 | 1.73 | 5.66 | 1.20 |
| 600 | 1.11 | 2.79 | 1.16 |
| 620 | 0.99 | 2.63 | 1.15 |
| 640 | 0.97 | 2.59 | 1.05 |
| 660 | 0.93 | 2.51 | 0.93 |
| 680 | 0.89 | 2.50 | 0.85 |
| 700 | 0.84 | 2.50 | 0.76 |

[1]1:1 blend is equal parts Comparative Binder 1 and the binder of this invention.

TABLE 2

| | RESIDUAL WEIGHT (PERCENT) | | |
|---|---|---|---|
| T (°C.) | 1:1 BLEND[1] | COMPARATIVE BINDER 2[2] | COMPARATIVE BINDER 3[3] |
| 40 | 99.81 | 99.88 | 99.91 |
| 60 | 99.51 | 99.68 | 99.80 |
| 80 | 99.37 | 99.56 | 99.72 |
| 100 | 99.29 | 99.50 | 99.66 |
| 120 | 99.22 | 99.45 | 99.61 |
| 140 | 99.15 | 99.42 | 99.58 |
| 160 | 99.08 | 99.39 | 99.56 |
| 180 | 99.00 | 99.36 | 99.54 |
| 200 | 98.89 | 99.31 | 96.12 |
| 220 | 98.75 | 99.24 | 95.80 |
| 240 | 98.62 | 99.09 | 95.51 |
| 260 | 98.48 | 98.74 | 95.31 |
| 280 | 98.28 | 97.83 | 95.14 |
| 300 | 97.99 | 96.21 | 94.99 |
| 320 | 97.51 | 95.73 | 94.85 |

TABLE 2-continued

| | RESIDUAL WEIGHT (PERCENT) | | |
|---|---|---|---|
| T (°C.) | 1:1 BLEND[1] | COMPARATIVE BINDER 2[2] | COMPARATIVE BINDER 3[3] |
| 340 | 96.60 | 95.38 | 94.68 |
| 360 | 95.49 | 95.06 | 94.49 |
| 380 | 94.91 | 94.76 | 94.30 |
| 400 | 94.58 | 94.48 | 94.12 |
| 420 | 94.37 | 94.25 | 94.01 |
| 440 | 94.24 | 94.07 | 93.94 |
| 460 | 94.16 | 93.94 | 93.91 |
| 480 | 94.09 | 93.85 | 93.89 |
| 500 | 94.05 | 93.78 | 93.87 |
| 520 | 94.03 | 93.74 | 93.86 |
| 540 | 94.02 | 93.73 | 93.85 |
| 560 | 94.01 | 93.71 | 93.84 |
| 580 | 94.00 | 93.71 | 93.83 |
| 600 | 93.99 | 93.70 | 93.82 |

[1]Alumina formulated with 4.4% by weight of a 1:1 blend of Comparative Binder 1 with the binder of this invention
[2]Alumina formulated with 4.4% by weight PVOH
[3]Alumina formulated with 4.4% by weight PEG

What is claimed is:

1. A method for using a polymeric binder, comprising:

1) forming a ceramic slip comprising a ceramic powder, a liquid, and the polymeric binder;

2) forming a ceramic part from the ceramic slip; and 3) heating the ceramic part to effect removal of the polymeric binder; wherein the polymeric binder comprises a first polymer, and from 10 to 90 percent by weight of a second polymer, and wherein the first polymer comprises, as polymerized units, at least one monomer selected from the group consisting of: alkyl esters of methacrylic acids; alkyl esters of acrylic acids; vinylidene halides; vinyl halides; acrylonitrile; methacrylonitrile; styrene; and hydroxy functional vinyl monomers, and the second polymer comprises, as polymerized units, at least 5 percent by weight of 2-(3-oxazolidinyl)ethyl methacrylate, based on the total weight of the first polymer.

2. The method of claim 1, wherein the 2-(3-oxazolidinyl) ethyl methacrylate in the second polymer is present at a level of from 30 to 60 percent by weight based on the total weight of the second polymer.

3. The method of claim 1 wherein the second polymer further comprises, as polymerized units, at least one monoethylenically unsaturated monomer selected from the group consisting of: alkyl esters of acrylic acid, alkyl esters of methacrylic acid, vinylidene halides, vinyl halides, acrylonitrile, methacrylonitrile; vinyl formate, vinyl acetate, vinyl propionate, styrene, and hydroxy functional vinyl monomers.

4. A method for preparing a ceramic slip, comprising combining a ceramic material, a liquid, and at least 5 percent by weight of a polymer comprising 2-(3-oxazolidinyl)ethyl methacrylate.

5. A ceramic slip comprising a ceramic material, a liquid, and a polymer comprising, as polymerized units, at least 5 percent by weight of 2-(3oxazolidinyl)ethyl methacrylate.

6. The method of claim 1 wherein said ceramic part is heated over the temperature range from 170° C. to 600° C.

7. The method of claim 1 further comprising sintering the ceramic part by heating the ceramic part to a temperature of at least 1000° C.

* * * * *